United States Patent [19]

Nelson

[11] 3,852,672

[45] Dec. 3, 1974

[54] FOUR-QUADRANT MULTIPLIER-NOTCH FILTER DEMODULATOR

[75] Inventor: Everett J. Nelson, Bellevue, Wash.

[73] Assignee: The Boeing Company, Seattle, Wash.

[22] Filed: Oct. 29, 1973

[21] Appl. No.: 410,433

[52] U.S. Cl. .................. 328/1, 73/88.5 R, 307/308, 324/61 R, 328/141

[51] Int. Cl. .................. G01b 7/16

[58] Field of Search .................. 338/2, 3, 4, 5, 6; 329/198, 103, 140; 328/1; 307/308; 324/61 R; 73/88.5 R

[56] References Cited

UNITED STATES PATENTS 3,283,574 11/1966 Roth .................. 307/308

3,493,876 2/1970 Zimmerman .................. 328/141

*Primary Examiner*—John Kominski

*Attorney, Agent, or Firm*—Brown, Murray, Flick & Peckham

[57] ABSTRACT

A carrier-suppressed amplifier demodulator employing a four-quadrant multiplier in such a fashion that all of the signal generated sidebands of the carrier and the carrier frequency are multiplied times the carrier center frequency by the multiplier. A notch filter coupled to the output of the multiplier is tuned to twice the carrier center frequency and removes the multiplier doubled carrier center frequency, leaving only the signal which generated the carrier sidebands. This produces an output signal which has improved transient response and low carrier frequency ripple.

5 Claims, 2 Drawing Figures

PATENTED DEC 3 1974 3,852,672

FOUR-QUADRANT MULTIPLIER-NOTCH FILTER DEMODULATOR

BACKGROUND OF THE INVENTION

Figures 1, 2:
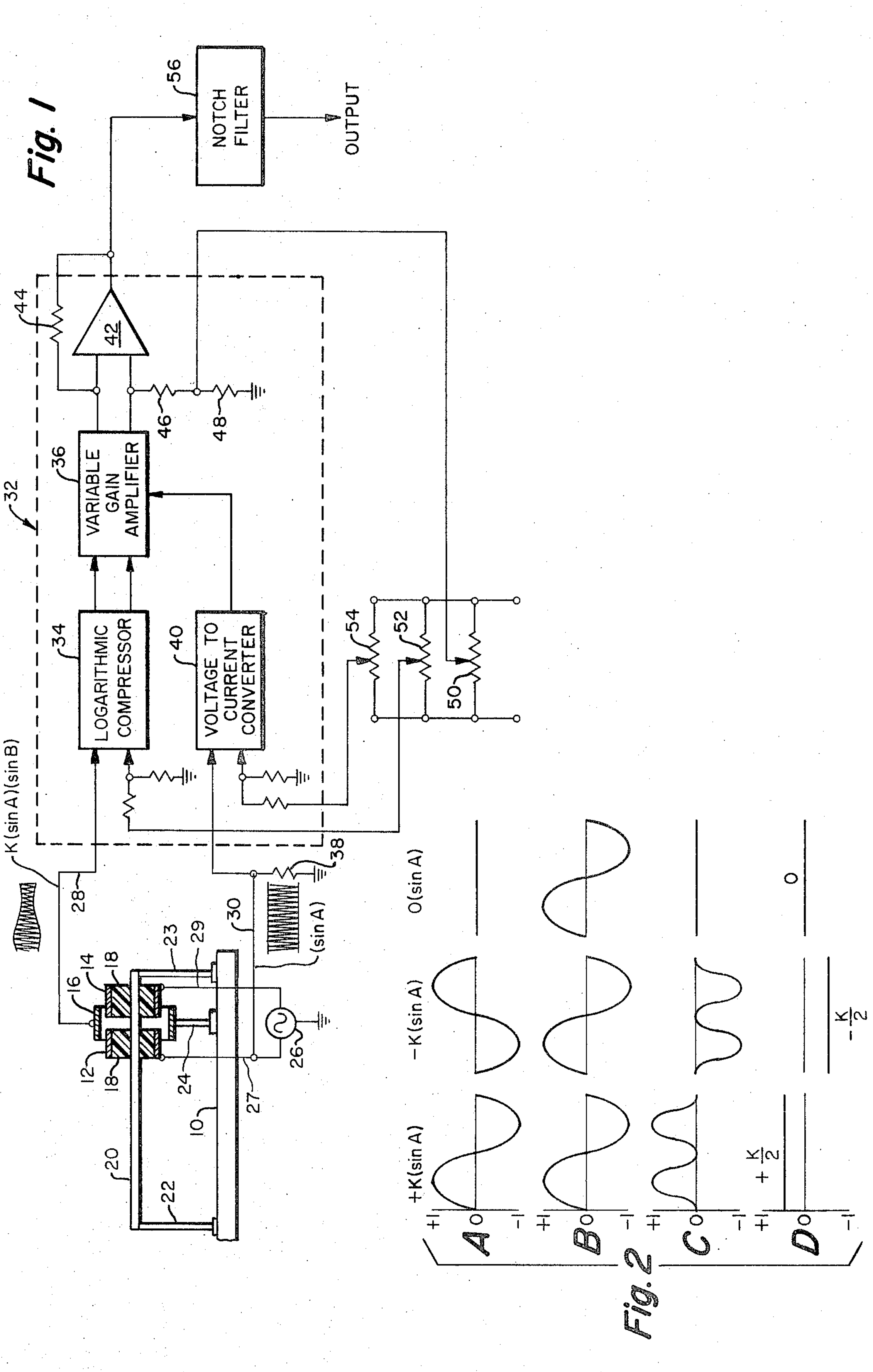

While not limited thereto, the present invention is particularly adapted for use in cases where a transducer signal, such as that from a capacitive strain gage, is used to modulate a carrier signal, the modulated carrier being demodulated to obtain a voltage indicative of the measured parameter, such as strain. In the past, carrier-suppressed amplifier demodulators employed ring demodulators which depended on diode or transistor switch charge, capacitance-resistance decay rates to produce the demodulated output voltage or current where the resistance and capacitance determined the decay rate and the amount of carrier ripple present in the demodulated output. Such previous systems, however, had limited frequency and trasient response and were deficient in that carrier ripple was present in the output.

SUMMARY OF THE INVENTION

In accordance with the present invention, a new and improved carrier-suppressed amplifier demodulator is provided having improved frequency and transient response and which reduces the ripple in the output of the carrier-suppressed amplifier demodulator. The system of the invention avoids any form of switching in the demodulator and utilizes a four-quadrant multiplier coupled to an output notch filter.

Specifically, there is provided in accordance with the invention a carrier-suppressed amplifier demodulator comprising means for generating án oscillatory carrier signal of fixed frequency (SIN A), means for generating a modulating signal K(SIN B), means for modulating said carrier signal with said modulating signal to produce a modulated signal K(SIN B) (SIN A), means for multiplying the modulated signal with the carrier signal to produce an output multiplied signal K[SIN B] [½(1 − COS 2A)], and means for passing the multiplied signal through a notch filter tuned to the frequency COS 2A to produce a signal K/2 SIN B which is proportional to K SIN B, the modulating signal.

Instead of using a sinusoidal carrier signal, it is also possible to use any oscillatory or repetitive waveform such as a rectangular or triangular waveform. That is, any repetitive waveform can be broken down into its descrete sinusoidal components; and the demodulator will perform the same operation on each of these components.

The above and other objects and features of the invention will become apparent from the following detailed description taken in connection with the accompanying drawings which form a part of this specification, and in which:

FIG. 1 is a block schematic circuit diagram of the system of the invention; and

FIG. 2 comprises waveforms illustrating the operation of the system of FIG. 1.

With reference now to the drawings, and particularly to FIG. 1, the amplifier demodulator of the invention is shown, for purposes of illustration, as being coupled to a capacitive strain gage. The capacitive strain gage mounts directly on a specimen surface 10 and is provided with a signal conditioning module which generates alternating current excitation for the gage, and which demodulates the gage output, producing an electrical analog of the measured, or indicated strain. The capacitive strain gage itself consists electrically of two variable capacitors connected as a half Wheatstone bridge. The capacitor plates comprise concentric cylinders 12, 14 and 16, the cylinders 12 and 14 being disposed within the cylinder 16. The dielectric between the plates 12 or 14 and 16 is air, or another gaseous medium whose dielectric constant is relatively unaffected by temperature, or a vacuum. The inner capacitor plates or cylinders 12 and 14 are connected through insulating spacers 18 to a cantilevered rod 20 connected at its end opposite the capacitor plates to a bracket 22 which is, in turn, secured to the specimen surface 10. Likewise, the outer capacitor plate 16, which is normally centered with respect to the inner plates 12 and 14, is connected through a bracket 24 to the specimen surface 10. The cantilevered rod 20 is constrained to move axially with respect to capacitor plate 16 by a flexure 23. Further details of the strain gage, per se, can be had by reference to copending application Ser. No. 296,969, filed Oct. 12, 1972.

With the arrangement shown, the strain induced in the specimen 10 and resultant elongation will vary the symmetrical relationship of the plates 12 and 14 with respect to the plate 16. The plates 12 and 14 are connected to a source of alternating current voltage 26. In this manner, an alternating current capacitive bridge is effected, the bridge being balanced when the inner capacitor plates 12 and 14 are symmetrical with respect to plate 16. However, when the rod 20 and plates 12 and 14 move to the left or right in response to strain in the surface 10, the bridge becomes unbalanced whereby a strain modulated alternating current signal will appear between the capacitor plate 16 and ground.

Assuming that the voltages of the lead wires 27 and 29 connecting the alternating current source 26 to the capacitor plates 12 and 14 are represented as +½ SIN A and −½ SIN A with respect to ground, respectively, movement of the capacitor plates 12 and 14 within the plate 16 will modulate that signal to produce a signal equal to K(SIN A) (SIN B) where K(SIN B) is the transducer stimulus. Under changing specimen strain conditions, the inner capacitor plates 12 and 14 will move axially with respect to the outer cylinder 16. Thus, the capacitance between the outer cylinder and one of the inner cylinders increases as a function of specimen elongation while, at the same time, the capacitance between the outer cylinder and the other inner cylinder decreases. Thus, with alternating current excitation voltage (+½ SIN A) applied to plate 12 and (−½ SIN A) applied to plate 14, the output voltage of plate 16 on lead 28 will vary linearly with changes in specimen strain.

The modulated signal on lead 28 and the unmodulated signal on lead 30 are applied to a four-quadrant multiplier which may, for example, be of the type sold by Analog Devices, Inc. of Norwood, Massachusetts and identified as their AD530 Analog Multiplier. It includes a logarithmic compressor 34 having one input connected to the lead 28. The output of the logarithmic compressor 34 is applied to a variable gain amplifier 36. The unmodulated signal on lead 30 is applied across the resistor 38 and is also applied to the input of a voltage-to-current converter 40 in the multiplier 32. The output of the voltage-to-current converter, in turn, is applied to the variable gain amplifier 36. The variable gain amplifier 36 is connected to the two inputs of an operational amplifier 42 having a resistive feedback path 44. One of the two inputs to the operational amplifier 42 is connected to a voltage divider comrising resistors 46 and 48; and the junction of these two resistors is connected to a potentiometer 50. Similarly, potentiometer 52 is connected to the input of the logarithmic compressor 34; while potentiometer 54 is connected to the input of the voltage-to-current converter 40.

With the arrangement shown, the four-quadrant multiplier 32 will multiply the modulated and unmodulated signals on leads 28 and 30 to produce a signal proportional to:

$$K(SIN^2A)\ (SIN\ B) \tag{A}$$

Trigonometrically, this can be rewritten as:

$$K[SIN\ B]\ [\tfrac{1}{2}(1-COS\ 2A)] \tag{B}$$

By passing the signal represented by Equation (B) at the output of the four-quadrant multiplier 32 through a notch filter 56 tuned to the frequency COS 2A, the resulting signal at the output is:

$$K/2\ SIN\ B \tag{C}$$

which is proportional to one-half of the transducer stimulus.

Examples of waveforms appearing at various points in the circuit for static transducer stimulus are shown in FIG. 2. That is, in the waveforms of FIG. 2, it is assumed that (SIN B) equals K, a constant. Three examples are given wherein K is positive, K is negative and K equals zero. Waveform A represents the transducer signal while waveform B represents the carrier frequency (i.e., SIN A). It will be noted that when the transducer stimulus K is positive, waveform A is in phase with waveform B and the output of multiplier 32 is positive. On the other hand, when the transducer stimulus K is negative, waveform A is 180° out of phase with respect to waveform B with the result that the output of multiplier 32 is negative. When K equals zero, the output of the multiplier is, of course, also zero. After passing through notch filter 56, the demodulator output appears as waveform D wherein it is positive when K is positive, negative when K is negative and zero when K is zero.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A carrier-suppressed amplifier demodulator comprising:

means for generating a carrier signal of fixed frequency, means for generating an oscillatory modulating signal, means for modulating said carrier signal with said modulating signal to produce a modulated signal, means for multiplying said modulated signal with said carrier signal to produce an output multiplied signal, and means for passing said multiplied signal through a notch filter to produce an output signal proportional to the modulating signal.

2. A carrier-suppressed amplifier demodulator comprising:

means for generating a carrier signal of fixed frequency SIN A, means for generating a modulating signal K(SIN B), means for modulating said carrier signal with said modulating signal to produce a modulated signal K(SIN B) (SIN A), means for multiplying said modulated signal with said carrier signal to produce an output multiplied signal K[SIN B] [½(1 − COS 2A)], and means for passing said multiplied signal through a notch filter tuned to the frequency COS 2A to produce a signal K/2 SIN B which is proportional to K SIN B, the modulating signal.

3. The amplifier demodulator of claim 2 wherein said means for multiplying comprises a four-quadrant multiplier.

4. The amplifier demodulator of claim 3 wherein said four-quadrant multiplier includes a logarithmic compressor to which said modulated signal is applied, a voltage-to-current converter to which said modulating signal is applied, and a variable gain amplifier coupled to the output of said logarithmic compressor and said voltage-to-current converter.

5. The amplifier demodulator of claim 4 including an operational amplifier interposed between said variable gain amplifier and said notch filter.

* * * * *